(Model.)
M. KLEIN.
APPARATUS FOR CUTTING HAIR.
No. 395,444. Patented Jan. 1, 1889.
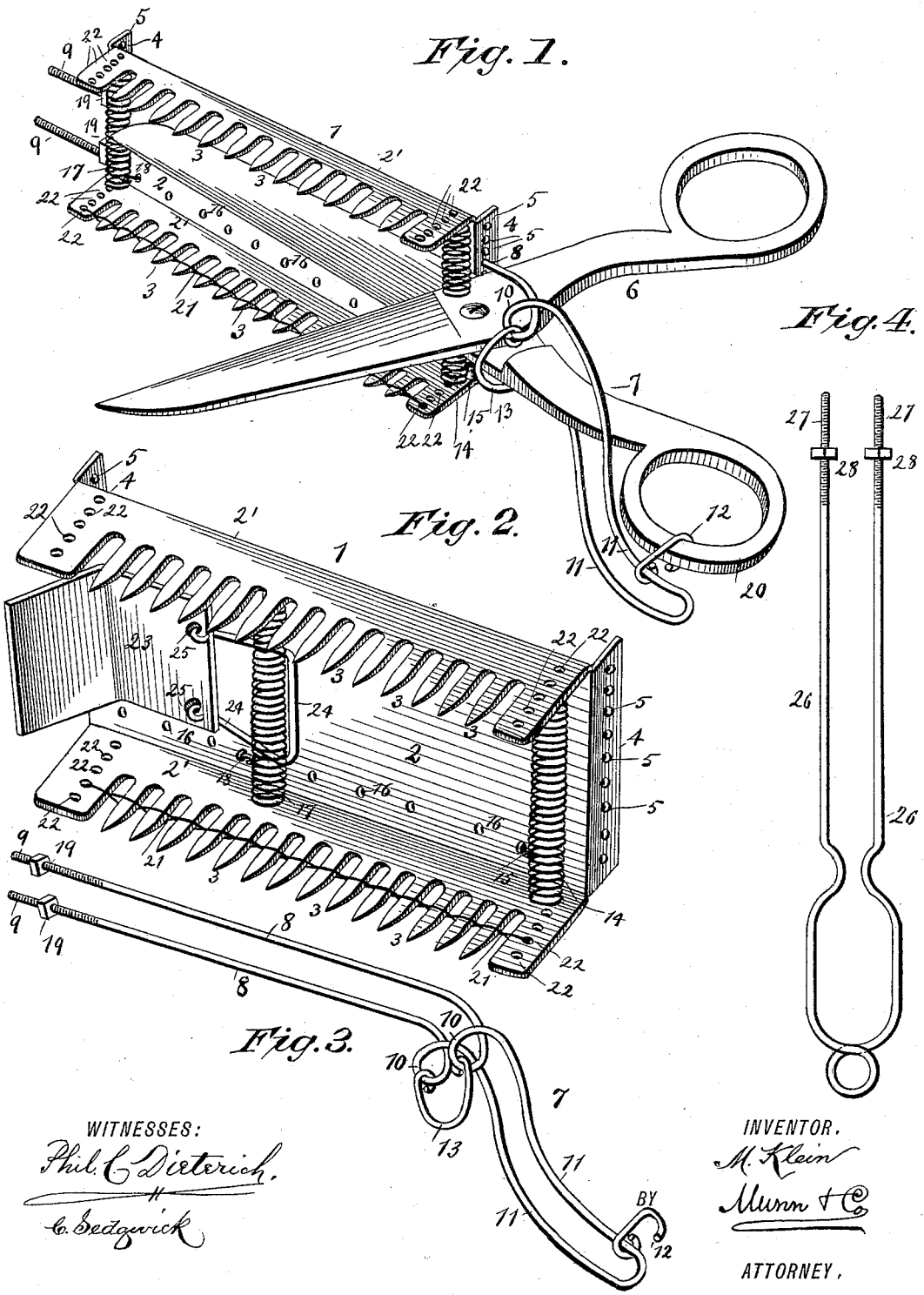
WITNESSES:
Phil. C. Dieterich
C. Sedgwick
INVENTOR.
M. Klein
Munn & Co.
ATTORNEY.

UNITED STATES PATENT OFFICE.

MARCUS KLEIN, OF CHICAGO, ILLINOIS.

APPARATUS FOR CUTTING HAIR.

SPECIFICATION forming part of Letters Patent No. 395,444, dated January 1, 1889.

Application filed May 14, 1888. Serial No. 273,833. (Model.)

*To all whom it may concern:*

Be it known that I, MARCUS KLEIN, of Chicago, in the county of Cook and State of Illinois, have invented a new and Improved Apparatus for Cutting Hair, of which the following is a full, clear, and exact description.

This invention relates to an apparatus for cutting hair, and has for its object to provide an apparatus combining a comb and a pair of scissors so connected and arranged together as to be adjusted for scissors of different sizes, and also for regulating the length of the hair-cut.

The invention will be set forth in the following description, and pointed out in the claims.

Reference is to be had to the accompanying drawings, forming a part of this specification, in which similar figures of reference indicate corresponding parts in all the views.

Figure 1 is a perspective view of the device. Fig. 2 is a portion thereof, showing the scissors detached and an attachment for preventing the points of the scissors from slipping. Fig. 3 is a detail detached, and Fig. 4 represents an attachment which may be used with the apparatus.

In carrying out this invention I provide a frame, 1, constructed of any desirable material—such as metal, tortoise-shell, or celluloid—and formed with a bottom, 2, and upturned sides 2′, having teeth 3, which serve as combs for the hair. The ends of the frame 1 are provided with downwardly-extending lips 4, having a series of perforations, 5.

6 represents a pair of scissors, which are attached to the frame 1 by means of a wire frame, 7, formed with the straight portions 8, having their outer ends screw-threaded, as at 9, the loops 10, and the curved portions 11, one of which is provided with a hook, 12. The loops 10 have connected thereto a U-shaped wire guard, 13.

At one end of the frame 1 is located a coil-spring, 14, secured to the bottom thereof by means of a wire, 15, passing through holes 16, and having its ends twisted together. At the opposite end of the frame 1 is located a similar coil-spring, 17, secured to the bottom of the frame 1 by means of a wire, 18, passing through holes 16, and having its ends twisted together.

In order to use the scissors 6 with the frame 1, one of the blades of the scissors is placed in a vertical position within the frame 1, the back of the blade resting in the coil-springs 14 and 17. The straight portions 8 of the wire frame 7 are then inserted through two of the perforations 5 and secured to the frame 1 by the nuts 19. The coiled springs 14 and 17 thus serve as rests for one of the blades of the scissors and keep it steady.

It will be seen, as shown in Fig. 1, that the loop portions 10 will extend on each side of the scissors adjacent to their pivotal point, and the wire guard 13 will extend over the top of the scissors, thereby serving to keep them in place at the inner end of the frame 1. The curved portions 11 of the frame 7 will extend back to the thumb-hole 20 of the scissors, and will be connected thereto by the hook 12.

In determining the length to which the hair is desired to be cut off the scissors are adjusted to and from the teeth 3 on the side of the frame 1 which is nearest to the head. This adjustment is made by withdrawing the straight portions 8 of the frame 7 and inserting them in two of the perforations 5 to bring the frame 7 nearer to or farther from the teeth 3 on the side of frame 1 opposite the head, the scissors also in this adjustment being correspondingly located in the coil-springs 14 and 17. In this adjustment the length of hair to be cut off will correspond to the distance from the scissor-blades to the side 2′ opposite that adjacent to the head, the ends of the hair projecting between the teeth 3 of the outer side and the hair lying across the frame 1 between the blades of the scissors.

In order to shorten the teeth and provide for the blades of scissors of different widths, the depth of the teeth 3 is regulated by means of a detachable wire, 21, which passes through one of the series of holes 22 in the ends of one of the sides 2′ of the frame 1 and is interwoven between the teeth 3. The wire 21 may be employed with both sides 2′, if desired.

Referring to Fig. 2 of the drawings, I have shown an attachment to prevent the points of the scissors from slipping, which consists in a bent plate, 23, having one portion resting on the bottom of the frame 1 and the other extending upright. The plate 23 is provided with a U-shaped wire rod, 24, attached thereto, having its hooked ends engaging perforations 25 in the plate 23.

The coil-spring 17 is secured in adjusted position on the bottom of the frame 1 by means of the wire 18, engaging any one of the series of holes 16, located in the bottom of the frame 1, and, in connection with the plate 23, which is attached to the coil-spring 17 by means of the arms of the wire 24, placed in the coil-spring 17, provides a rest and stop for a scissor-blade of any length.

It will be seen that by means of this invention an apparatus for cutting hair is provided which can be readily adjusted for regulating the length of the hair to be cut, and which is adapted for different-sized scissors.

When it is desired to simply use the frame 1 as a comb, the frame 7 and the scissors 6 are detached, and the wire frame 26, with the screw-threaded ends 27, is passed through the holes 5 in the lips 4 of the frame 1 and secured by the nuts 28, and then serves as a handle for the comb.

Having thus described my invention, I claim as new and desire to secure by Letters Patent—

1. An apparatus for cutting hair, consisting of a double comb-frame provided with a scissors-securing frame and steadying-rests for one of the blades of the scissors, in combination with a pair of scissors having its blades located between the combs, substantially as described.

2. An apparatus for cutting hair, consisting of a double comb-frame provided with a scissors-securing frame laterally adjustable thereon and steadying-rests for one of the blades of the scissors, in combination with a pair of scissors having its blades located between the combs, substantially as described.

3. In an apparatus for cutting hair, the double comb-frame 1, formed with a bottom, 2, having a series of holes, 16, and lips 4, with perforations 5, sides 2', with teeth 3, and adjustable scissor-blade rests consisting of coiled springs 14 and 17, secured by wires 15 and 18 to the bottom of said frame, substantially as described.

4. In an apparatus for cutting hair, the double comb-frame 1, formed with a bottom, 2, having a series of holes, 16, and lips 4, with perforations 5, sides 2', with teeth 3, adjustable scissor-blade rests consisting of coiled springs 14 and 17, secured by wires 15 and 18 to the bottom of the frame 1, and the scissor-blade stop consisting of a bent plate, 23, with a U-shaped wire, 24, engaging the coiled spring 17, substantially as described.

5. The combination, with a double comb-frame, 1, having sides 2', with teeth 3, and the series of holes 22 at the ends of sides 2', of a wire, 21, extending over and engaging the teeth 3, substantially as described.

6. The combination, with a double comb-frame, 1, having the series of holes 16 in its bottom and, having adjustable coiled-spring rests 14 and 17, also secured to said bottom, and depending lips 4, with holes 5, of the wire frame 7, with straight portions 8, extending through the lips 4 and secured by nuts 19, and the loops 10, with a wire guard, 13, the curved portions 11, with a hook, 12, and the scissors 6, having one of its blades resting in the coiled springs 14 and 17 and its pivotal portion located within the loops 10, and the guard 13 and the hook 12, engaging the thumb-hole 20 of said scissors, substantially as described.

MARCUS KLEIN.

Witnesses:
ANDREW J. WELIN,
IGNAZ FREUND.